United States Patent [19]

Wissgott

[11] 4,442,105
[45] Apr. 10, 1984

[54] FRUIT COLORING PROCESS

[75] Inventor: Ulrich Wissgott, La Tour-de-Peilz, Switzerland

[73] Assignee: Societe d'Assistance Technique pour Produits Nestle S.A., Lausanne, Switzerland

[21] Appl. No.: 455,599

[22] Filed: Jan. 4, 1983

[51] Int. Cl.³ ...................... A23L 1/275; A23L 1/212
[52] U.S. Cl. .................................... 426/250; 426/102; 426/103; 426/540; 426/639; 426/252
[58] Field of Search ............... 426/250, 252, 540, 639, 426/102, 103

[56] References Cited

U.S. PATENT DOCUMENTS 2,692,831 10/1954 Weckel ................................ 426/540
2,785,071 3/1957 Mathews ............................. 426/639
3,307,954 3/1967 Blakemore .......................... 426/102
4,115,595 9/1978 Jordan ................................. 426/639
4,156,023 5/1979 Jessen et al. ........................ 426/250

Primary Examiner—Jeanette M. Hunter
Attorney, Agent, or Firm—Vogt & O'Donnell

[57] ABSTRACT

A process for artificially coloring fruit wherein an aqueous medium containing the fruit is treated with a dye and an edible calcium salt at an elevated temperature until the desired quantity of dye penetrates the fruit tissue, then the pH is lowered at least to a value at which the dye becomes substantially insoluble, after which the pH is raised gradually while ensuring that the pH of the inner parts of the fruit does not exceed 7, and finally the fruit is separated from the aqueous medium.

10 Claims, No Drawings

FRUIT COLORING PROCESS

The present invention relates to a method of colouring fruits in which the migration of the colour therefrom is prevented.

Cherries which are artificially coloured are commonly known as no-bleeding sweet cherries and are used in such commodities as canned fruits; they are usually coloured with erythrosine.

Traditionally, cherries are brined in aqueous $SO_2$ media which allows the cherries to be bacteriostatically stored for several months. Although fresh cherries are heterogeneously coloured by their own naturally occurring anthocyanin pigments the aqueous $SO_2$ brine bleaches the fruit to a homogeneous yellow colour. In this condition the fruit may be coloured by a food dye to a uniform colour shade. Of the large number of cherry varieties, Bigarreaux Napoleon, which does not possess the usual cherry red colour, is the most used in the USA and France for being artificially coloured. However a problem with such artificially coloured cherries is that the colour tends to migrate out of the cherries and this is particularly unsatisfactory when the cherries are used in admixture with pale coloured fruits such as peaches and pears because the colour migrating out colours the peaches and pears as well as the packing medium which renders the canned fruit mixture undesirable in appearance to the consumer.

Traditionally, this problem has been overcome by dyeing the cherries in a solution containing erythrosine and removing any unbound dye by a technology relying on multiple washing steps. This procedure is time and energy consuming and extremely laborious. The small amount of dye remaining is retained by the cherries but the pale coloured cherries are not visually appealing and any natural cherry blemishes are very evident.

We have surprisingly found that cherries and other fruits having a very satisfactory colour which does not migrate can be obtained by fixing the colourant with an edible calcium salt by a simple process which does not require multiple washing steps.

Accordingly, the present invention provides a process for artificially colouring fruit characterised in that an aqueous medium containing the fruit is treated with a dye and an edible calcium salt at an elevated temperature until the desired quantity of dye penetrates the fruit tissue, then the pH is lowered at least to a value at which the dye becomes substantially insoluble, after which the pH is raised gradually while ensuring that the pH of the inner parts of the fruit does not exceed 7 and finally the fruit is separated from the aqueous medium.

Fruits that may be coloured by the process of this invention are naturally deep-coloured fruits such as ordinary red cherries which have been bleached by a brining process in an aqueous $SO_2$ medium or they are naturally pale-coloured fruits such as peaches, apples, pears, bananas or pineapples. However, they are preferably cherries of the variety Bigarreaux Napoleon which do not possess the normal cherry red colouration but which have been brined in an aqueous $SO_2$ medium. The fruits which have been brined are generally desulphited before being added to the aqueous medium used in the process of this invention.

The amount of fruit in the aqueous medium is generally determined by practical considerations and conveniently from 0.5 to 4.0 parts, preferably 1.0 to 2.0 parts by weight of aqueous medium are used per part by weight of fruit.

Conveniently the fruit is added to the aqueous medium at ambient temperature and the mixture is heated to a temperature above 80° C., advantageously above 90° C. and especially to the boil.

The dye and the edible calcium salt are suitably added to the mixture at the elevated temperature and the elevated temperature is suitably maintained for a period of up to 1 hour, preferably from 20 to 40 minutes to allow the desired quantity of dye to penetrate the fruit tissue.

The dye may be used in an amount from 0.001% to 0.100%, preferably from 0.005% to 0.050% and especially from 0.01% to 0.02% by weight based on the weight of the fruit. The dye is conveniently a food-acceptable dye containing one or more carboxy functional groups, such as erythrosine.

The amount of the edible calcium salt that is used may be from 0.025% to 3.0%, preferably from 0.05% to 1.5% and especially from 0.075% to 0.75% by weight based on the weight of fruit. The edible calcium salt may be the salt of an edible organic acid such as lactic, gluconic, acetic, citric or formic acid, or a salt of an edible inorganic acid. Preferably the salt is calcium gluconate or calcium chloride.

The calcium salt may be added at different stages of the dyeing procedure. For example, it may be added together with the dye, in a separate operation after dyeing, or by repeated addition in a dyeing and fixation operation wherein, if desired, different calcium salts may be used. Preferably the calcium salt is added at the same time as the dye, thus fixing the dye rapidly without loss.

The pH is conveniently lowered to not less than 2.0, for instance not less than 2.5, and is preferably lowered so that is has a value from 3.0 to the pH at which the dye becomes insoluble. The desired pH is conveniently obtained by adding the appropriate proportion of a food-acceptable acid such as critic acid. The elevated temperature is desirably maintained for up to 30 minutes, preferably from 10 to 20 minutes at this reduced pH.

The pH is then raised gradually, conveniently to not more than 9 and preferably not more than 8, suitably over a period from 10 minutes to 1 hour and desirably from 20 to 40 minutes by the addition of a food-acceptable alkaline material, for example, sodium hydroxide solution. The elevated temperature is maintained for this time during which the pH of the inner parts of the fruit should not exceed 6.5.

After the pH has been raised by the addition of alkali, the coloured fruit may be separated by draining off the aqueous medium. The fruit may then be rinsed with cold water and conveniently stored in an aqueous solution at a pH at which the dye is insoluble prior to being further used in production.

The following Examples further illustrate the present invention.

EXAMPLE 1

Commercially brined cherries of the species Bigarreaux Napoleon, after desulphiting, were mixed with water in a weight ratio of 2 parts of cherries to 3 parts of water and boiled.

0.015% by weight of erythrosine and 0.5% by weight of calcium gluconate (both amounts based on the weight of cherries) were added and boiling was continued for 30 minutes. During this time, erythrosine penetrated into the fruit tissue.

Citric acid was added until the pH reached 3.5 whereupon the aqueous solution became light pink because the dye had become insoluble. The boiling was continued for a further 15 minutes and then the pH of the system was gradually increased over a period of 30 minutes to a pH of 7 by the addition of sodium hydroxide solution. During this time the pH of the inner parts of the cherries did not exceed 6.5.

Afterwards, the solution was drained off and the cherries were rinsed with cold water before being stored in an aqueous solution at a pH of 3.5.

The cherries had an attractive red colour and there was no colour migration.

EXAMPLE 2

By following a similar procedure to that described in Example 1 but using 0.1% by weight of calcium chloride based on the weight of cherries instead of the calcium gluconate there used, the resultant dyed cherries had a satisfactory red colour and there was no colour migration.

I claim:

1. A process for artificially colouring fruit which comprises:
   (a) combining a pale-coloured fruit with from 0.5 to 4.0 parts by weight of water per part by weight of the fruit;
   (b) treating the fruit/water mixture with from 0.001% to 0.100% by weight of a food acceptable dye containing carboxyl groups based on the weight of the fruit and with an effective amount of an edible calcium salt sufficient to fix the dye in the fruit at an elevated temperature of from 80° C. to the boiling point of the mixture;
   (c) lowering the pH of the mixture to at least a value at which the colourant becomes substantially insoluble;
   (d) raising the pH of the mixture such that the pH of the inner parts of the fruit does not exceed 7; and then
   (e) separating the coloured fruit from the mixture.

2. A process according to claim 1, wherein the aqueous medium containing the fruit is heated to a temperature above 90° C.

3. A process according to claim 1, wherein the amount of dye used is from 0.005% to 0.050% by weight based on the weight of the fruit.

4. A process according to claim 1, wherein the dye is erythrosine.

5. A process according to claim 1, wherein the amount of edible calcium salt used is from 0.05% to 1.5% by weight based on the weight of the fruit.

6. A process according to claim 1, wherein the edible calcium salt is calcium gluconate or calcium chloride.

7. A process according to claim 1, wherein the calcium salt and the dye are added together to the aqueous medium.

8. A process according to claim 1, wherein after treatment with the dye, the pH is lowered so that it has a value of from 3 to the pH at which the dye becomes insoluble and the elevated temperature is maintained for a period of from 20 to 40 minutes at this reduced pH.

9. A process according to claim 1, wherein the pH is raised over a period of from 20 to 40 minutes at the elevated temperature during which the pH of the inner parts of the fruit does not exceed 6.5.

10. A process according to claim 1, wherein the fruit consists of cherries which have been brined in an aqueous $SO_2$ medium.

* * * * *